United States Patent [19]

Eguchi

[11] Patent Number: 4,646,230
[45] Date of Patent: Feb. 24, 1987

[54] DATA TRANSFER CONTROL SYSTEM

[75] Inventor: Kazutoshi Eguchi, Tokyo, Japan

[73] Assignee: Tokyo Shibaura Denki Kabushiki Kaisha, Kawasaki, Japan

[21] Appl. No.: 505,817

[22] Filed: Jun. 20, 1983

[30] Foreign Application Priority Data

Jun. 25, 1982 [JP] Japan .................................. 57-109513

[51] Int. Cl.⁴ ............................................. G06F 12/06
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,092,715 | 5/1978 | Scriver | 364/200 |
| 4,133,030 | 1/1979 | Huettner et al. | 364/200 |
| 4,155,119 | 5/1979 | DeWard et al. | 364/200 |
| 4,156,932 | 5/1979 | Robinson et al. | 364/200 |

Primary Examiner—James D. Thomas
Assistant Examiner—Florin Munteanu
Attorney, Agent, or Firm—Cushman, Darby & Cushman

[57] ABSTRACT

A data transfer control system which is provided between a main memory for storing programs, data and channel control blocks (CCB's) and I/O processors for controlling channels, for converting an address from the I/O processors to an address specifying the main memory, first address memory which is addressed by combination data of a first identification number identifying the I/O processors and a second identification number identifying the channel and stores a CCB start address of the main memory; second address memory which is addressed by the combination data and stores a start address in a data transfer section included in the channel control block; and a data controller in which, when the first and second identification numbers, a flag, and a relative address are received from the channels through the I/O processors, one of the first and second address memories is selected in accordance with the flag value, the data controller generating an address by adding the address read out from the selected memory and the relative address and then sending the added address to the main memory.

8 Claims, 7 Drawing Figures

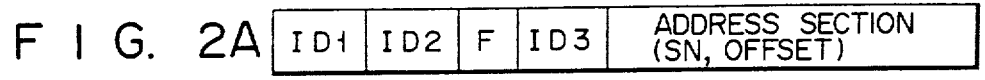
FIG. 2A
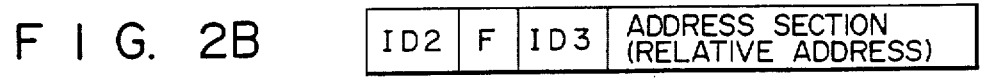
FIG. 2B
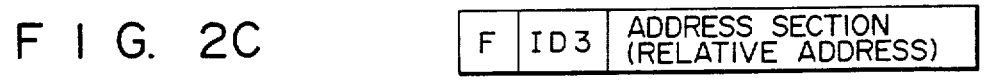
FIG. 2C
FIG. 3
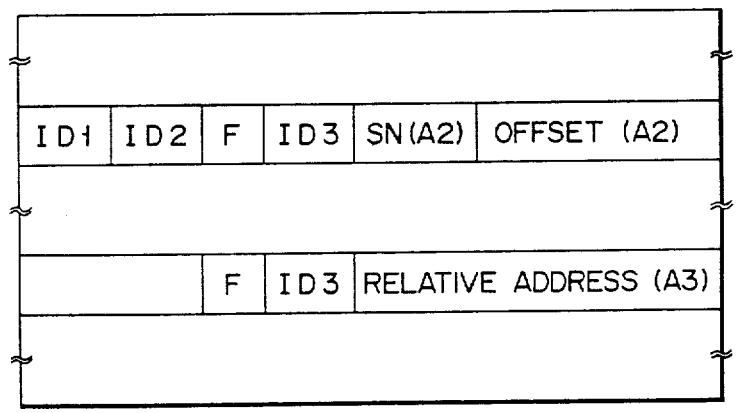

F I G. 4
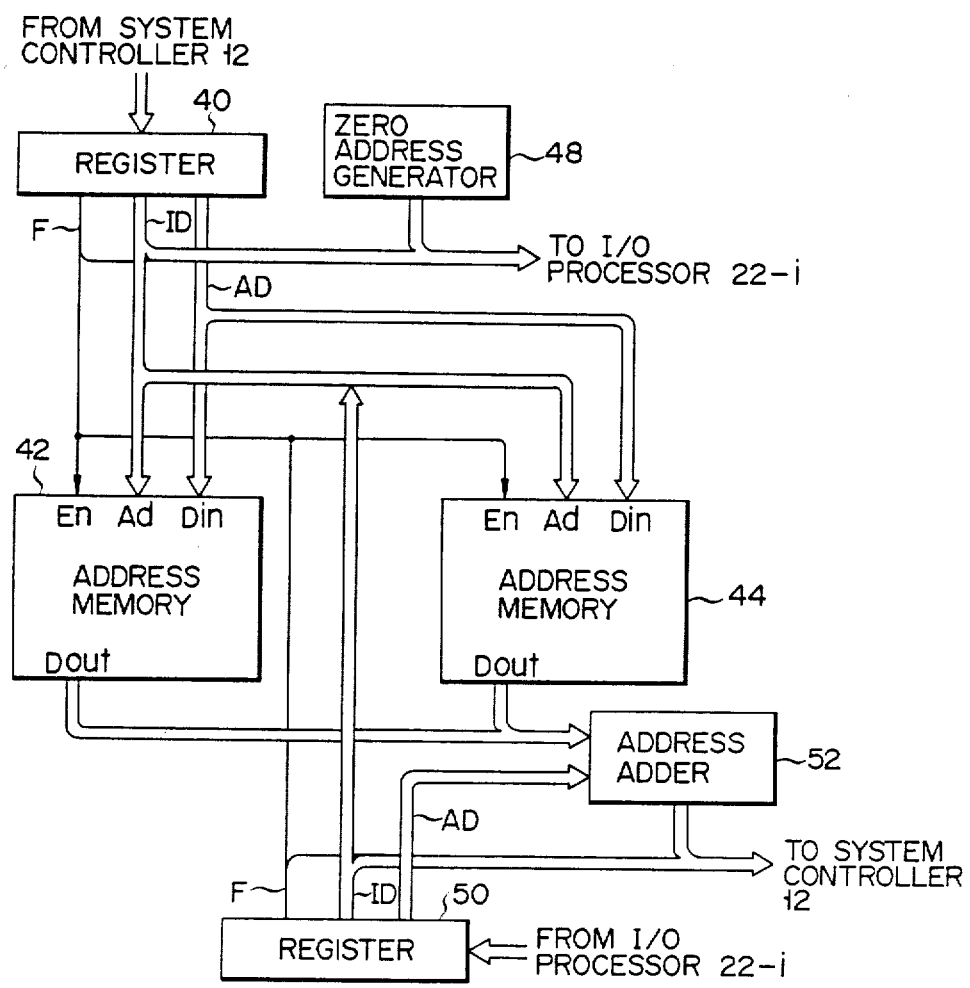

DATA TRANSFER CONTROL SYSTEM

BACKGROUND OF THE INVENTION

The present invention relates to a data processing system consisting of a main memory, a central processing unit (CPU), an I/O processor and other structure known to those of skill in the art, and, more particularly, to an address control system for accessing the main memory during data transfer between the main memory and the I/O processor.

In a conventional data processing system, input/output operation between the main memory and the I/O processor is controlled by the I/O processor after control data required for data transfer are transferred to the I/O processor from the CPU. For example, the control data for data transfer are stored in a region of the main memory in the form of a channel control block (CCB) by the CPU. The start address of that region, i.e., the start address of the channel control block, is transferred to a channel, or the like, of the I/O processor. The channel reads out the channel control block from the main memory in accordance with the start address. The channel accesses the main memory in accordance with a data transfer start address stored in a predetermined address of the channel control block so that the data transfer begins.

A data processing system such as described above is disadvantageous, since it is strongly dependent on the architecture of the CPU, e.g., a channel is closely related to the CPU. For this reason, when the architecture of the CPU is changed and the bit length of the address becomes longer, the channel can no longer be used.

If a system with an address having a long bit length, that is, a virtual storage system, is to be implemented, there is an increase in both the number of signal lines for address buses in the I/O buses and the number of driver/receiver gates to be connected to such signal lines, according to the bit length.

This drawback is due to the fact that the I/O processor produces the address data for accessing the main memory.

SUMMARY OF THE INVENTION

It is an object of the present invention to provide a data transfer control system which performs centralized control of address data for data transfer between a main memory and an input/output section in a data processing system and which is not dependent on the architecture of a CPU.

In order to achieve the above object, there is provided a data transfer control system connected between a main memory and an input/output section, comprising an address memory for storing a start address of an area of the main memory which is to be accessed, and an address calculation section for generating an address data for accessing the main memory from a relative address transferred from the input/output section and an address stored in the address memory.

BRIEF DESCRIPTION OF THE DRAWINGS

FIGS. 2A to 2C show the formats of the address data used in the system shown in FIG. 1;

FIG. 3 schematically shows the format of a channel control block in the main memory shown in FIG. 1;

FIG. 4 is a detailed block diagram of the data controller shown in FIG. 1; and

DETAILED DESCRIPTION OF THE PREFERRED EMBODIMENT

Figure 1:
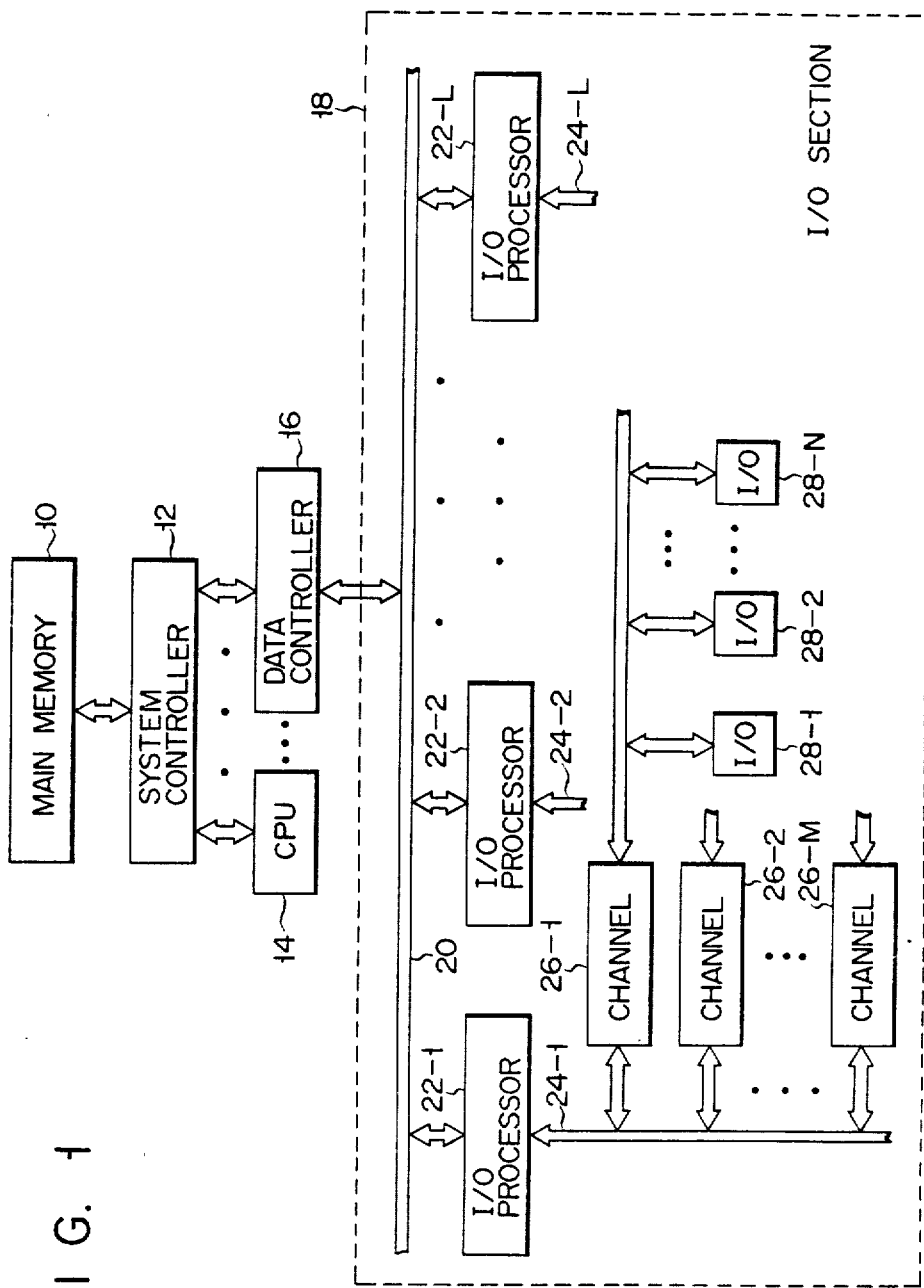
FIG. 1 is a block diagram of a data processing system including a data controller executing data transfer control according to the present invention.

The preferred embodiment of the present invention will now be described with reference to the accompanying drawings. FIG. 1 is a block diagram of a data processing system using a data transfer control system according to the embodiment of the present invention. The system has a main memory 10, a system controller 12, a CPU 14, a data controller 16, and an I/O section 18. It is assumed that the main memory 10 has a memory controller. The main memory 10, the CPU 14 and the data controller 16 are connected to the system controller 12; the system controller 12 serves as an interface of these parts. Although only one CPU 14 and only one data controller 16 are illustrated in FIG. 1, a plurality of CPUs 14 and a plurality of data controllers 16 may be connected to the system controller 12. The data controller 16 executes the control of data transfer. That is, the data controller 16 controls memory addresses for data transfer between the main memory 10 and the I/O section 18. The details of the data controller 16 will be described later. Although the I/O section 18 connected to the data controller 16 may have various arrangements, it has the following arrangement according to this embodiment. I/O processors 22-1, 22-2 to 22-L are connected to the data controller 16 through a DMA bus 20. Channels 26-1, 26-2 to 26-M are connected to each I/O processor 22-i (where i=1 to L) through I/O buses 24-i. Each channel 26-j (where j=1 to M) is connected to I/O devices 28-1, 28-2 to 28-N.

Before describing the arrangement of the data controller 16, the address format used in this system will be described. It is assumed that the data processing system uses a virtual storage system as the addressing system. Therefore, the address section of the address data handled by the system controller 12 consists of a segment number SN and an OFFSET, as shown in FIG. 2A. During transfer between the main memory 10 and the I/O section 18, the address data further includes identification data ID and a flag F. Identification data ID1 is for identification of the data controllers 16 (generally plural in number) connected to the system controller 12. Identification data ID2 is for identification of the I/O processors 22-1, 22-2 to 22-L connected to the data controller 16. Identification data ID3 is for identification of the channels 26-1, 26-2 to 26-M connected to the I/O processor 22-i. A flag F represents that the address section of the address data (including the flag F) represents a channel control block (CCB) having a format of: virtual address A1, a data transfer area virtual address A2, or a chain relative address A3. The CCB is a data block which is stored in the main memory 10 and which includes the control data necessary for data transfer between the main memory 10 and the channel 26-j of the I/O processor 22-i. The CCB consists of various pieces of data such as a channel control word (CCW) as a command of an input/output operation, a data transfer area start virtual address A2 representing the origin address of the data transfer region, a chain relative address A3, and a data transfer amount. FIG. 3 shows the schematic format of the CCB. Note that only address data is shown. Although the format of the address data to be used for accessing the main memory 10 from the CPU 14 is different from that shown in FIG. 2A, it will not be described here since it is not directly related to the present invention. Since a physical address is required to access the main memory 10, an address converter is required in order to convert a virtual address to a physical address. It is assumed that such an address converter is included in the memory controller of the main memory 10.

FIG. 2B shows the format of the address data which is transferred between the data controller 16 and the I/O processors 22-1, 22-2 to 22-L through the DMA bus 20. In this context, the address is a relative address (to be described later), rather than a virtual address. The data shown in FIG. 2B is the same as the data shown in FIG. 2A minus the identification data ID1 for identifying the data controller 16. FIG. 2C shows the format of the address data transferred between the I/O processor 22-i and the channels 26-1, 26-2 to 26-M through the I/O bus 24-i. The data shown in FIG. 2C is the same as the data shown in FIG. 2B minus the identification data ID2 for identifying the I/O processor 22-i.

FIG. 4 is a block diagram of the portion of the data controller 16 which handles the address data. The data controller 16 does not perform any operations for data other than address data. The address data (data shown in FIG. 2A minus ID1) supplied from the system controller 12 is stored in a register 40. Among the data stored in the register 40, the flag F is supplied to enable terminals En of address memories 42 and 44. The identification data ID (ID2 +ID3) in the register 40 is supplied to address terminals Ad of the address memories 42 and 44. Address section AD, i.e., SN and OFFSET, in the register 40 is supplied to data input terminals Din of the address memories 42 and 44. An output data from a zero address (relative address) generator 48 together with the flag F and the identification data ID2 and ID3 in the register 40 are supplied to the DMA bus 20 and transferred to the I/O processor 22-i. The address data (FIG. 2B) from the I/O processor 22-i is stored in a register 50. As in the case of the flag F in the register 40, a flag F in the register 50 is supplied to the enable terminals En of the address memories 42 and 44. The identification data ID (ID2 +ID3) in the register 50 is similarly supplied to the address terminals Ad of the address memories 42 and 44. The address section in the register 50 is supplied to a first input terminal of an address adder 52. Data output terminals Dout of the address memories 42 and 44 are connected to a second input terminal of the address adder 52. An output data from address adder 52 together with the flag F and the identification data ID2 and ID3 in the register 50 is supplied to the system controller 12. Since the address memories 42 and 44 store virtual addresses, the address adder 52 adds the OFFSET from the address memories 42 and 44 and a relative address from the register 50.

Figure 5:
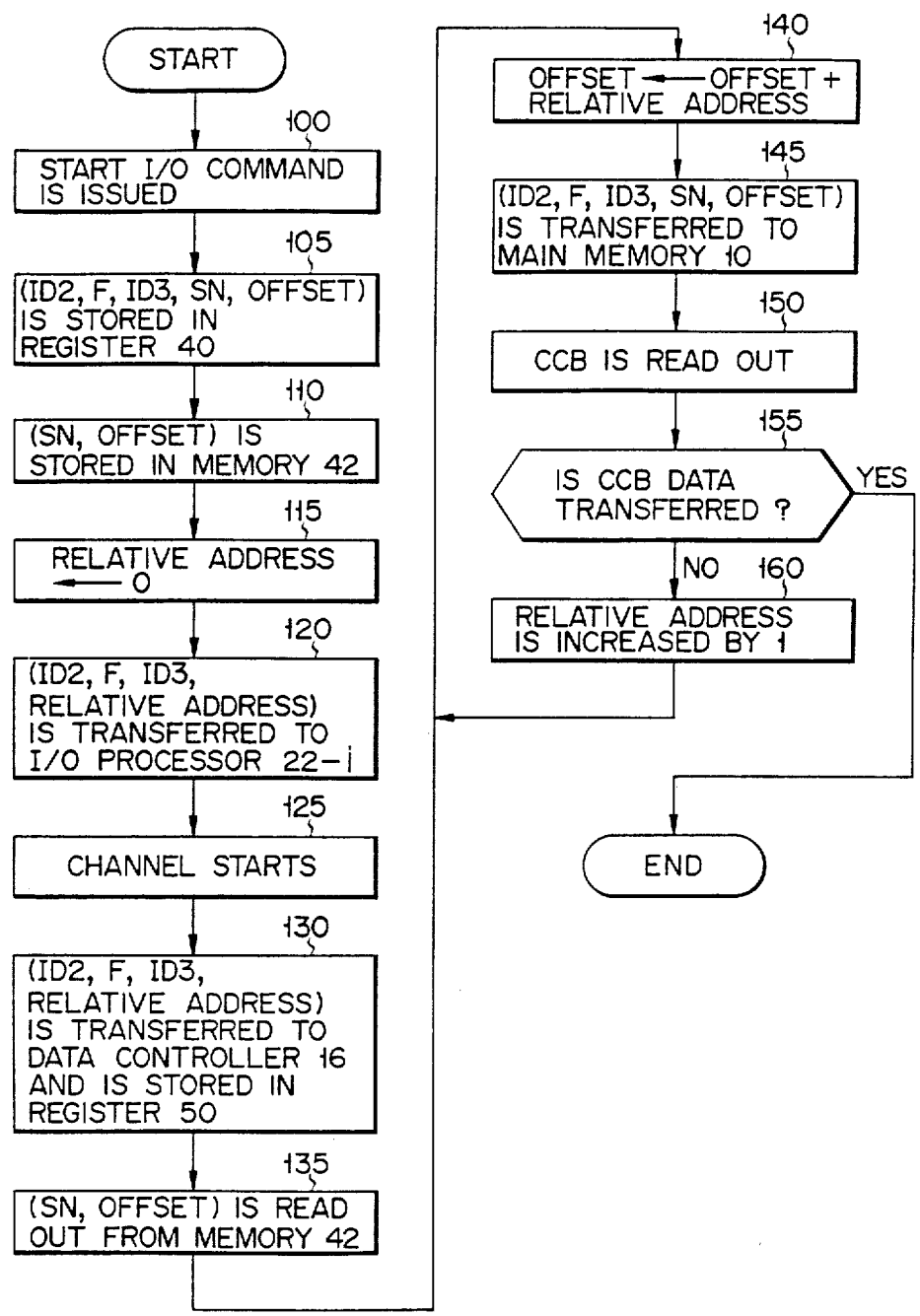
FIG. 5 is a flowchart showing the read operation of the channel control block in the system shown in FIG. 1.

The mode of operation of the data controller of this embodiment will now be described together with that of the data processing system. FIG. 5 is a flowchart showing the mode of operation for reading out the CCB from the main memory 10 and transferring it to a channel. In order to start the channel, in step 100 a START I/O command is issued from the CPU 14 and is supplied to the system controller 12. The address data included in the START I/O command has a format shown in FIG. 2A. The address section thereof indicates the CCB start virtual address A1. The system controller 12 designates the data controller 16 identified by the ID1 data and supplies the address data excluding the ID1 data to the data controller 16. The data controller 16 stores the input data in the register 40 as shown in step 105. As shown in FIG. 4, one of the address memories 42 and 44 is selected by the flag F. When the flag F indicates the CCB virtual address A1, the address memory 42 is selected. When the flag F indicates the data transfer area virtual address A2, the address memory 44 is selected. Since the address data included in the START I/O command is the CCB start virtual address A1, the address memory 42 is selected in step 110. The CCB start virtual address A1, i.e., SN and OFFSET, is stored in the address memory 42 of which address is designated by the identification data ID (ID2 +ID3). In step 115, a zero relative address is generated by the zero address generator 48. In step 120, data as shown in FIG. 2B which consists of the flag F and the identification data ID2 and ID3 in the register 40 and the relative address (zero) is transferred to the I/O section 18 through the DMA bus 20. The I/O processor 22-i which is identified by the identification data ID2 reads the data excluding the ID2, as shown in FIG. 2C, from the DMA bus 20. The I/O processor 22-i then produces the read-in data, which is supplied to the I/O bus 24-i. In step 125, the channel 26-j is identified by the identification data ID3 and is started. After reading the address data (relative address; here, zero), the channel 26-j supplies the data shown in FIG. 2C to the I/O processor 22-i, that is, the data consisting of the read-in relative address (zero) together with the flag F (representing the CCB start virtual address A1) and its identification data ID3, so as to start readout of the CCB in the main memory 10. The I/O processor 22-i adds its identification data ID2 to the input data, and sends the data as shown in FIG. 2B to the data controller 16. In step 130, the data ID2, F, ID3 and the relative address are stored in the register 50. In accordance with the flag F and the identification data ID (ID2+ID3), the CCB start virtual address A1 (SN, OFFSET) is read from the address memory 42, in step 135. In step 140, the relative address in the register 50 is added to the OFFSET out of the readout virtual address so as to create a virtual address for accessing the main memory 10. In step 145, the flag F and the identification data ID2 and ID3 in the register 50 and the identification data ID1 of the data controller 16 are added to the virtual address, thus providing the address data as shown in FIG. 2A, which is supplied to the main memory 10. This virtual address is converted into a physical address by the memory controller in the main memory 10. Then, in step 150, the CCB is read out and is transferred to the channel 26-j. Assuming the CCB is read from the main memory 10 in units of bytes, the channel 26-j increases the relative address by 1 as shown in steps 155 and 160 every time 1-byte data is read out. The series of operations starting from step 140 are repeatedly performed. When the readout of CCB is completed, the operation step goes to an end step. Thus, the operation of the I/O section 18 such as a channel is not dependent upon a virtual address or a physical address. Even if the architecture of the CPU 14 is changed, only the data controller 16 and not the I/O section 18 needs to be modified, providing a flexible and adaptive data processing system.

Although the above description has been made regarding the readout of the CCB, the same applies to the actual data transfer. For example, the same applies to the case where the data transfer area start virtual address A2 included in the CCB as shown in FIG. 3 is read out. When the data transfer area start address A2 is stored in the register 40 of the data controller 16, the address memory 44 is then selected by the flag F. The SN (A2) and the OFFSET (A2) are stored in the address memory 44. The subsequent operation is the same as that described above; the data as shown in FIG. 2B including the relative address (zero) is transferred to the I/O section 18 through the DMA bus 20 and a channel is started. Taking into account only the data transfer amount defined by the CCB, the channel performs the data transfer based on the relative address.

According to the present invention, a data controller is provided which performs centralized control of the address data for data transfer operations in a data processing system. As a result, even if a virtual address is adopted, it is only handled in the portion including the main memory and the data controller. Thus, the peripheral devices outside the data controller are not dependent upon the virtual address but can access the main memory in accordance with the relative address starting with zero for data transfer operations, which corresponds to the data transfer amount. A change in the architecture of the CPU or the system controller can be absorbed by the data controller alone, and the I/O section of the channels and the like need not be changed. In general, a virtual address is longer than a physical address. Consequently, if a virtual address is adopted, the hardware of the system normally increases. However, according to the embodiment of the present invention, even if a virtual address is used, peripheral devices outside the data controller handle the relative address. The bit length of an address bus in the I/O bus need only be the maximum transfer amount within a series of data transfer operations. Accordingly, the amount of hardware of the I/O buses and channels is decreased.

The present invention is not limited to the particular embodiment described above, and various changes and modifications may be made within the spirit and scope of the present invention. For example, in the above embodiment, the CCB start virtual address A1, and the data transfer area start virtual address A2 are stored in separate memories. However, they may be stored in a single memory. In this case, such data is stored in an address ID (ID2 +F +ID3). In the above description, data transfer between the main memory and the input/output section is performed under input/output control of the channel. However, the system need not have a channel. For example, the present invention may be applied to a system in which the CPU constantly controls data transfer, a system in which input/output operations are fixed, or a system which does not use a virtual address. In the system which does not use a virtual address, the virtual address of the data having the format as shown in FIG. 2A is replaced by a physical address, and the remaining features of the system remain the same.

What is claimed is:

1. A data transfer control system, provided between: (a) a main memory which stores a program, data and a channel control block therein and (b) a plurality of I/O processors, each of which control at least one channel, said control system converting an address from said I/O processors to an address specifying a region of said main memory, comprising:

first memory means for storing a CCB start address indicative of a starting address of said channel control block in a section of said main memory in which said channel control block is stored, said first memory means being addressed by a combination data including a first identification number for identifying at least one of a plurality of said I/O processors and a second identification number for identifying at least one of a plurality of channels;

second memory means for storing a start address of a data transfer section, which start address is included in the channel control block, and which is addressed by said combination data of said first and second identification numbers; and control means for:

(1) during the readout of the channel control block, in accordance with said first and second identification numbers, a flag, and a relative address from said I/O processors: (a) selecting one of said first and second memory means which is indicated by a value of said flag, (b) readng out said CCB start address from an address sepcified by said combination data of said first and second identification numbers of said selected one of said first and second memory means, (c) adding said readout address and said relative address to form an added address, and (d) sending said added address to said main memory, and (2) during the data transfer between said main memory and one of said channels, in response to said first and second identification numbers, a flag, and a relative address from said I/O processors, (a) selecting one of said first and second memory means which is indicated by a value of of said flag, (b) reading out said start address in the transfer section from an address specified by said combination data of said first and second identification numbers of said selected one of said first and second memory means, (c) adding the readout addrss and said relative address to form an added address, and (d) sending said added address to the main memory.

2. A data transfer control system according to claim 1, wherein said control means is also for, in response to receiving said first and second identification numbers, said flag, and said CCB start address included in a start I/O instruction, selecting said first memory means in response to a value of said flag, and for writing said CCB start address into an address of said first memory means specified by said combination data of said first and second identification numbers.

3. A data transfer control system according to claim 2, wherein said control means is also for supplying said I/O processors with said start I/O instruction including address data, and includes means for adding said first and second identification numbers, said flag, and said relative address to said start I/O instruction, wheerin said relative address has a fixed value.

4. A data transfer control system according to claim 3, further comprising a plurality of I/O processors and a plurality of channels, and in which said I/O processors supply said channels with said start I/O instruction including address data to which said second identification number, the flag, and said relative address are added.

5. A data transfer control system according to claim 4, wherein said control means is also for, in response to receiving said second identification number which is successively outputted from said channels, said flag, said relative address having a fixed initial value, and said first identification number which is supplied from said I/O processors, selecting said first memory means in response to a value of said flag, and for reading out said CCB start address from an address of said first memory means sepcified by said combination data of said first and second identification numbers to send an address obtained by adding the readout address and the relative address to said main memory and to read out the channel control block from said main memory.

6. A data transfer control system according to claim 5, in which, when said control means receives said first and second identification number, said flag and said start address in the data transfer section included in said read out channel control block, said control means is also for selecting said second memory means in response to a value of the flag and for writing said start address in the data transfer section into said second memory means specified by said combination data of said first and second identification number.

7. A data transfer control system according to claim 6, in which said control means is also for supplying said I/O processors with said channel control block including the address data obtained by adding said relative address having a fixed value to said first and second identification numbers, and said flag, wherein said I/O processors send the channel control block including the second identification number, the flag and the relative address having a fixed value to said channels.

8. A data transfer control system according to claim 1, in which said CCB start address and said start address in said data transfer section are virtual addresses.

* * * * *